(12) United States Patent
Takahashi et al.

(10) Patent No.: US 8,511,837 B2
(45) Date of Patent: Aug. 20, 2013

(54) PROJECTION OPTICAL SYSTEM AND IMAGE PROJECTOR

(75) Inventors: Tatsuya Takahashi, Kanagawa (JP); Kazuhiro Fujita, Tokyo (JP); Issei Abe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 206 days.

(21) Appl. No.: 13/236,749

(22) Filed: Sep. 20, 2011

(65) Prior Publication Data

US 2012/0092628 A1 Apr. 19, 2012

(30) Foreign Application Priority Data

Oct. 14, 2010 (JP) .................. 2010-231951

(51) Int. Cl.
*G03B 21/14* (2006.01)
(52) U.S. Cl.
USPC ............ 353/98; 353/51; 353/78; 353/82; 353/119; 359/443; 348/782
(58) Field of Classification Search
USPC .......... 353/50, 51, 70, 77, 78, 82, 98, 119; 359/443, 449; 349/5; 348/744, 781, 782
See application file for complete search history.

(56) References Cited

U.S. PATENT DOCUMENTS

| | | | |
|---|---|---|---|
| 7,237,908 B2 * | 7/2007 | Suzuki et al. ............ | 353/77 |
| 2009/0116124 A1 | 5/2009 | Minefuji | |
| 2010/0165308 A1 | 7/2010 | Morikuni et al. | |
| 2010/0182575 A1 | 7/2010 | Amano et al. | |
| 2011/0038039 A1 | 2/2011 | Takaura et al. | |
| 2011/0238568 A1 * | 9/2011 | Booth et al. ............ | 705/39 |

FOREIGN PATENT DOCUMENTS

| | | |
|---|---|---|
| JP | 2008-165202 | 7/2008 |
| JP | 2009-276789 | 11/2009 |
| JP | 4396769 | 1/2010 |
| JP | 2010-152263 | 7/2010 |
| JP | 2010-152264 | 7/2010 |

* cited by examiner

*Primary Examiner* — Kevin Pyo
(74) *Attorney, Agent, or Firm* — IPUSA, PLLC

(57) ABSTRACT

A projection optical system configured to project an image onto a projection surface includes a first optical system including at least one dioptric system and having positive power as a whole; a second optical system including a reflection region and a transmission region; and a third optical system including at least one reflecting surface having power, and having positive power as a whole, wherein light entering the projection optical system passes through the first optical system to have a path thereof bent by the reflection region of the second optical system to be incident on the third optical system, and the light incident on the third optical system has the path thereof bent by the third optical system to pass through the transmission region of the second optical system to be incident on the projection surface.

11 Claims, 18 Drawing Sheets

PROJECTION OPTICAL SYSTEM AND IMAGE PROJECTOR

CROSS-REFERENCE TO RELATED APPLICATION

The present application is based upon and claims the benefit of priority of Japanese Patent Application No. 2010-231951, filed on Oct. 14, 2010, the entire contents of which are incorporated herein by reference.

BACKGROUND OF THE INVENTION

1. Field of the Invention

The present invention relates to a projection optical system and an image projector including the projection optical system.

2. Description of the Related Art

Recently, liquid crystal projectors, which are widely known as image projectors, have incorporated liquid crystal panels of higher resolution, have been improved in brightness with higher efficiency of light source lamps, and have been reduced in price. Further, small-size, light-weight image projectors using a digital micro-mirror device (DMD) or the like have been popular, so that image projectors have been widely used not only in offices or at school but also at home. In particular, front-type projectors have been improved in portability to be used at small meetings of a few people.

Ultra short focus projectors have the advantage of letting a presenter make a presentation without the shadow of the presenter appearing on a projection surface, but have the disadvantage of not being usable at a distance from the projection surface and thus being required to be embedded in the projection surface if the projection distance is shorter than the overall length of the optical system.

Such a disadvantage is eliminated by folding back an optical path with a folding mirror.

In these projectors, if optical systems are exposed, there arises the problem of dust deposition or the like. Therefore, the conventional projectors are equipped with a dustproof cover that provides protection against dust. (See, for example, Japanese Laid-Open Patent Application No. 2010-152263, Japanese Laid-Open Patent Application No. 2010-152264, Japanese Patent No. 4396769, and Japanese Laid-Open Patent Application No. 2009-276789.)

SUMMARY OF THE INVENTION

According to an aspect of the invention, a projection optical system configured to project an image onto a projection surface includes a first optical system including at least one dioptric system and having positive power as a whole; a second optical system including a reflection region and a transmission region; and a third optical system including at least one reflecting surface having power, and having positive power as a whole, wherein light entering the projection optical system passes through the first optical system to have a path thereof bent by the reflection region of the second optical system to be incident on the third optical system, and the light incident on the third optical system has the path thereof bent by the third optical system to pass through the transmission region of the second optical system to be incident on the projection surface.

According to an aspect of the invention, an image projector includes an image forming device configured to have an image formed in accordance with a modulating signal; a light source configured to emit light; and the projection optical system as set forth above, wherein the image forming device is illuminated with the light emitted from the light source to have the image formed in the image forming device magnified and projected onto the projection surface by the projection optical system.

The object and advantages of the invention will be realized and attained by means of the elements and combinations particularly pointed out in the claims.

It is to be understood that both the foregoing general description and the following detailed description are exemplary and explanatory and not restrictive of the invention as claimed.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
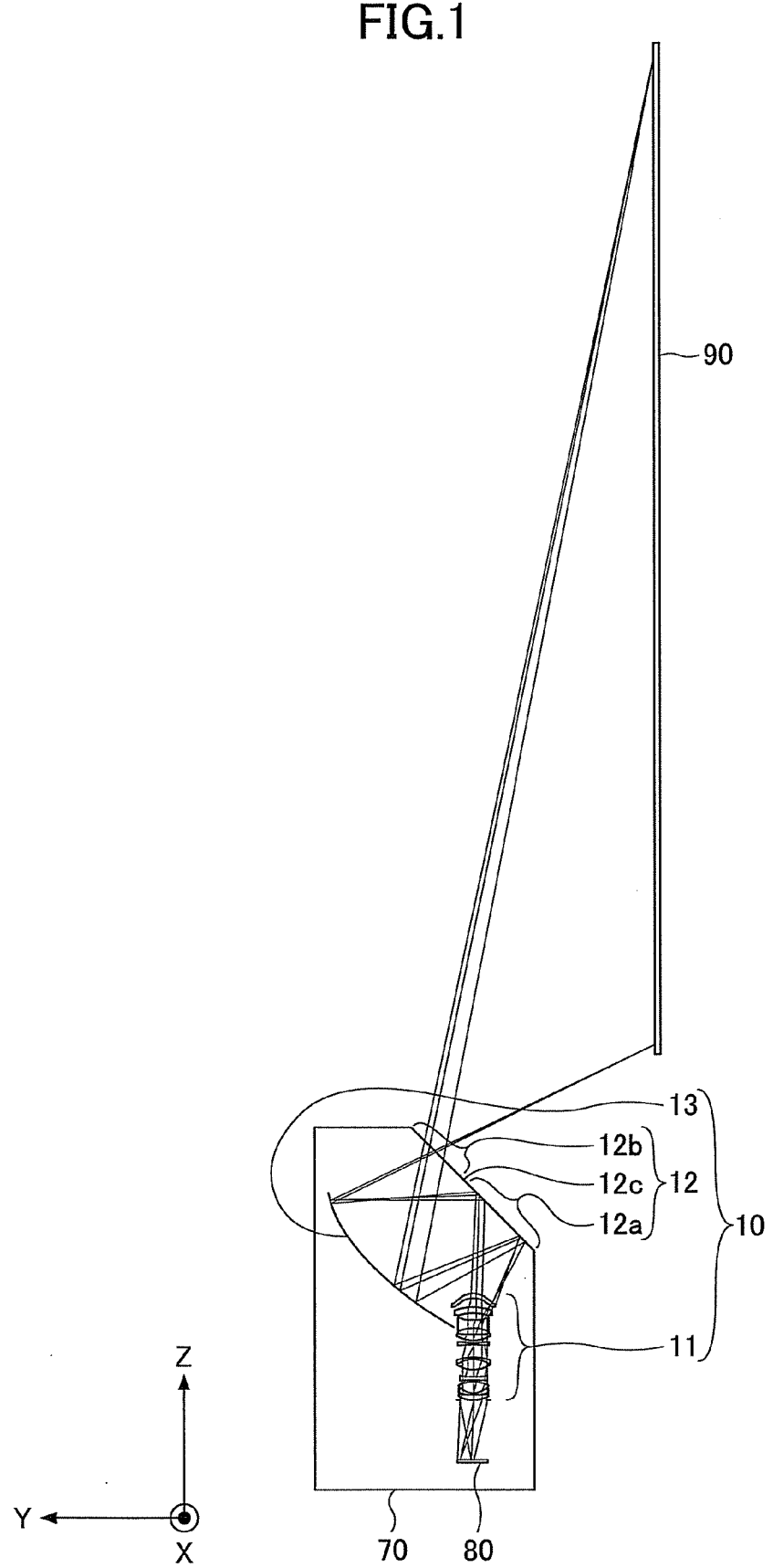
FIG. 1 is a ray diagram illustrating a projection optical system according to a first embodiment.

As described above, the conventional projectors incorporate dustproof covers. However, the dustproof covers provided in the conventional projectors do not have the function of folding (turning) back an optical path. This necessitates separately addressing the folding back of an optical path and the provision of a dustproof cover.

According to an aspect of the present invention, a projection optical system is provided that has an optical system that may also be used as a dustproof cover, and an image projector is provided that accommodates the projection optical system in a housing and uses the optical system as a dustproof cover.

A description is given below, with reference to the accompanying drawings, of embodiments of the present invention.

In the drawings, the same elements are referred to by the same reference numerals, and duplicate descriptions thereof are omitted.

[First Embodiment]

Figure 2:
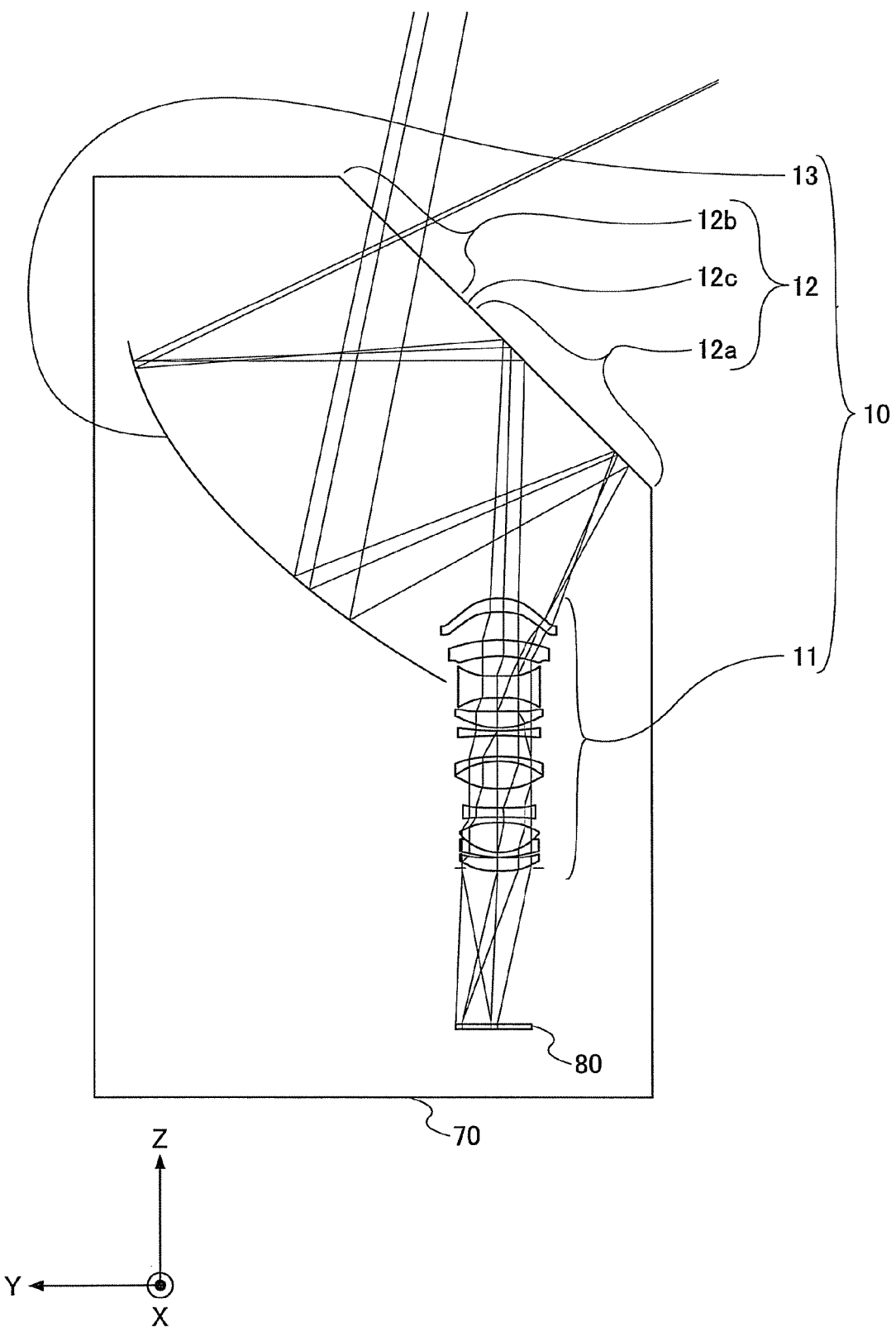
FIG. 2 is an enlarged view of part of FIG. 1 according to the first embodiment.

FIG. 1 is a ray diagram illustrating a projection optical system according to a first embodiment. FIG. 2 is an enlarged view of part of FIG. 1. In the coordinate system in FIG. 1 and FIG. 2, X, Y, and Z denote the long axis directions, the normal directions, and the short axis directions, respectively, of a screen 90 (a projection surface).

Referring to FIG. 1 and FIG. 2, a projection optical system 10 includes a first optical system 11, a second optical system 12, and a third optical system 13.

In the projection optical system 10, the first optical system 11 is a coaxial optical system including at least one dioptric system (lens), and has positive power as a whole. In this embodiment, the first optical system 11 is composed of eleven lenses, but may not be limited to this configuration.

Figure 3:
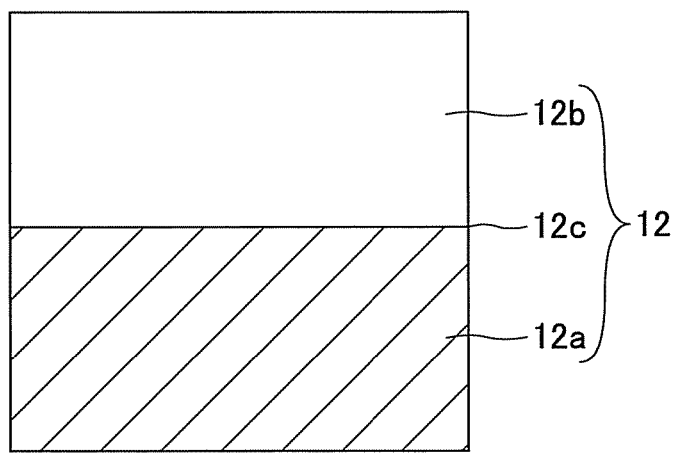
FIG. 3 is a diagram illustrating a second optical system viewed in a normal direction of a reflection region according to the first embodiment.

Referring to FIG. 1 and FIG. 2, the second optical system 12 includes a reflection region 12a, which may be part of the second optical system 12 that reflects light, and a transmission region 12b, which may be part of the second optical system 12 that transmits light. FIG. 3 is a diagram illustrating the second optical system 12 viewed in a normal direction of the reflection region 12a.

The second optical system 12 is so attached at a predetermined angle of inclination relative to an X-Y plane as to close an opening of a housing 70. That is, the second optical system 12 forms part of the wall of the housing 70, and the reflection region 12a of the second optical system 12 is provided on the inner wall surface of the wall of the housing 70. The reflection region 12a functions as a folding mirror that changes (bends) the path of light traveling from the first optical system 11 to the third optical system 13. The transmission region 12b has the function of transmitting light subjected to a path change by the third optical system 13. The light that has passed through the transmission region 12b reaches the screen 90.

The reflection region 12a and the transmission region 12b of the second optical system 12 may be unitarily formed or formed as a unitary body. Examples of the material of the reflection region 12a and the transmission region 12b include materials having a light transmitting characteristic, such as glass and plastic. The reflection region 12a may be formed by, for example, depositing a material having high reflectance, such as aluminum, on a surface of the material such as glass or plastic by vapor deposition. Hereinafter, the process of forming the reflection region 12a on a material having a light transmitting characteristic, such as glass or plastic, may be referred to as "reflection process." Since a boundary 12c between the reflection region 12a and the transmission region 12b is linear (straight), the reflection process may be performed with multiple pieces of the material to become second optical systems 12 being arranged, using vapor deposition or the like. This allows a large number of second optical systems 12 to be manufactured in a simple manner. In FIG. 3, the second optical system 12 is illustrated as having a rectangular planar shape. However, the second optical system 12 is not limited to a rectangular planar shape, and may have any planar shape.

Thus, the second optical system 12 has a function as an optical system having the reflection region 12a and the transmission region 12b. In addition, the second optical system 12 functions as a dustproof cover when the projection optical system 10 is accommodated (housed) in the housing 70. That is, the projection optical system 10 except for the second optical system 12 may be accommodated in the housing 70 having an opening, and the opening may be closed with the second optical system 12. As a result, the second optical system 12 forms part of the wall of the housing 70, and the reflection region 12a of the second optical system 12 is provided on the inner wall surface of the wall of the housing 70.

That is, since the second optical system 12 closes the opening of the housing 70, it is possible to prevent an entry of foreign matter into the housing 70 and to prevent contamination or breakage of the first optical system 11 and the third optical system 13. Further, the second optical system 12 serves as a dustproof cover as well. This facilitates assembly compared with the case where the dustproof cover is separately provided. In addition, a holding member to hold the dustproof cover and the second optical system 12, which is necessary in the case where the dustproof cover and the second optical system 12 are separate bodies, is unnecessary. Therefore, there is no concern for an eclipse of light by the holding member, thus facilitating the adjustment of positions.

Referring back to FIG. 1 and FIG. 2, the third optical system 13 is an optical system including at least one reflecting surface having power, and has positive power as a whole.

An image forming device 80 may be, for example, a light valve such as a liquid crystal panel. A light beam emitted from the image forming device 80 enters the first optical system 11, and is turned (reflected) back from the reflection region 12a of the second optical system 12 after passing through the first optical system 11. Thereafter, the light beam turned back from the reflection region 12a is further turned back from the third optical system 13, and is transmitted through the transmission region 12b of the second optical system 12 to be projected onto the screen 90. An image formed by the image forming device 80 is focused as an intermediate image in the optical path from the first optical system 11 to the third optical system 13. This intermediate image is further magnified to be projected onto and focused on the screen 90.

Rays of light near the optical axis form an intermediate image between the reflection region 12a of the second optical system 12 and the third optical system 13. Rays of light far from the optical axis form an intermediate image between the first optical system 11 and the reflection region 12a of the second optical system 12. By folding back the optical path with the reflection region 12a of the second optical system 12, it is possible to change the direction of projection from the direction of the depth of the optical system (a Z-axis direction) to the direction of the height of the optical system (a Y-axis direction). Therefore, even in the case where the projection distance is shorter than the overall length of the optical system, it is possible for an image projector including the optical system to perform projection without being embedded in the screen 90.

Further, since it is possible to shorten the projection distance, the image projector may be used in narrow meeting rooms as well. Furthermore, as another effect, it is possible to reduce a problem of the conventional projector in that a presenter comes between the projected image of the projector and a screen to cast a shadow on the projected image. Further, using an aspheric lens for one or more of the lenses of the first optical system 11 increases latitude of designing, thus making it possible to improve focusing performance on the screen 90. Further, if the positive-power reflecting mirror of the third optical system 13 has an anamorphic polynomial free-form surface shape, it is possible to adjust the curved surface shape of the reflecting surface on a reflection region basis, the reflection regions corresponding to respective image heights, so that it is possible to improve aberration correction performance.

The "anamorphic polynomial free-form surface" refers to a shape expressed by:

$$Z = X2 \cdot x^2 + Y2 \cdot y^2 + X2Y \cdot x^2 y + Y3 \cdot y^3 + X4 \cdot x^4 + X2Y2 \cdot x^2 y^2 + Y4 \cdot y^4 + X4Y \cdot x^4 y + X2Y3 \cdot x^2 y^3 + Y5 \cdot y^5 + X6 \cdot x^6 + X4Y2 \cdot x^4 y^2 + X2Y4 \cdot x^2 y^4 + Y6 \cdot y^6 + \ldots, \quad (1)$$

where $X2, Y2, X2Y, Y3, X2Y2$, etc., are coefficients with the vertical directions, the lateral directions, and the depth directions of a curved surface with reference to a projected image being Y directions, X directions, and Z directions, respectively.

In the first embodiment, a concave reflecting surface is employed as the third optical system 13. However, the third optical system 13 is not limited to a concave reflecting surface, and may be any catoptric device having light converging power, such as a Fresnel reflecting mirror or a hologram reflecting mirror.

It is desired that the reflection region 12a of the second optical system 12 be positioned in such a region as to prevent a light beam reflected back from the reflection region 12a from being blocked by the first optical system 11 or to prevent a light beam reflected back from the third optical system 13 from being blocked by the reflection region 12a.

Here, a supplementary description is given, using comparative examples, of the projection optical system 10 according to the first embodiment.

Figure 4:
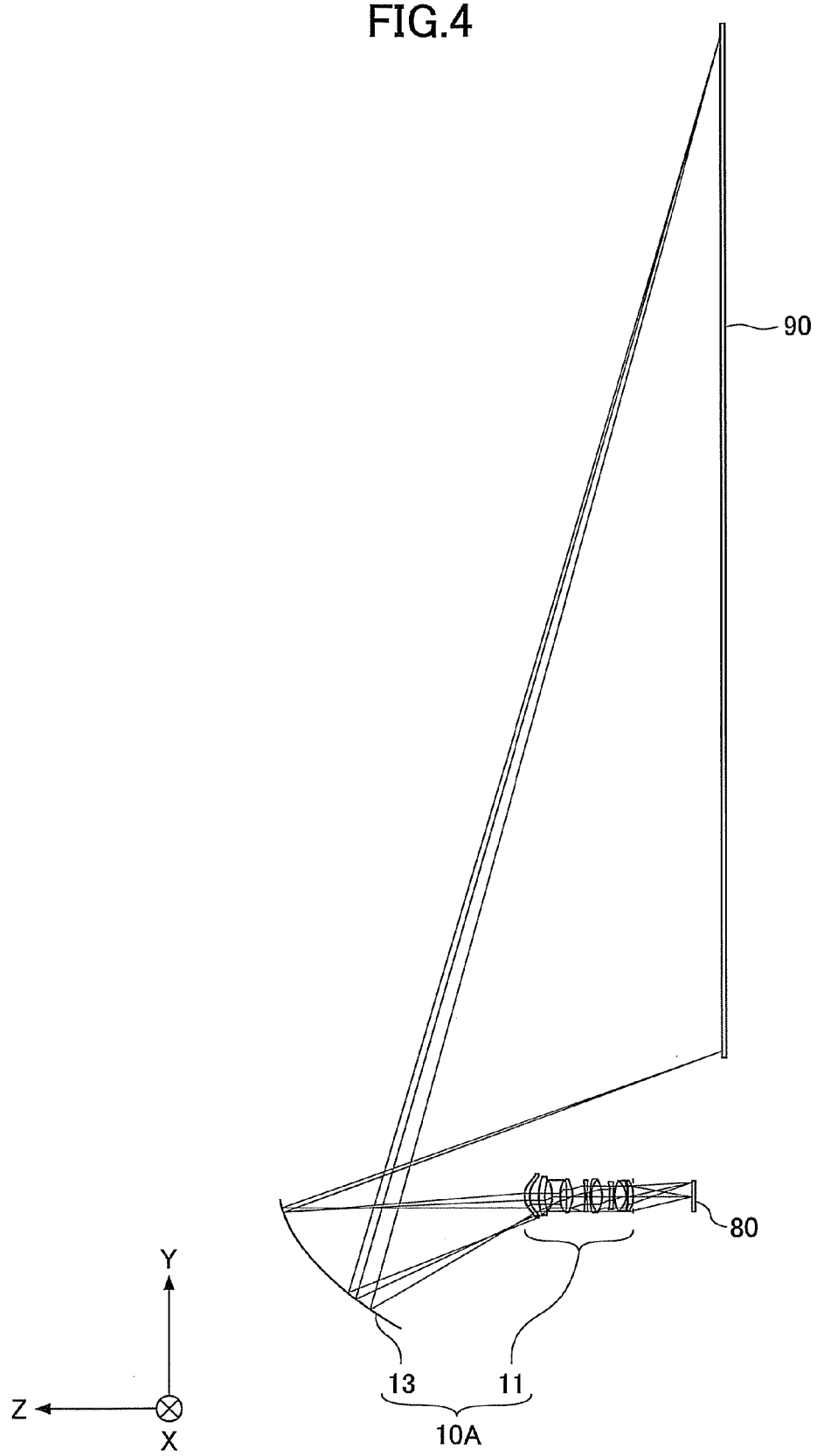
FIG. 4 is a ray diagram illustrating a projection optical system according to Comparative Example 1 in the first embodiment.
Figure 5:
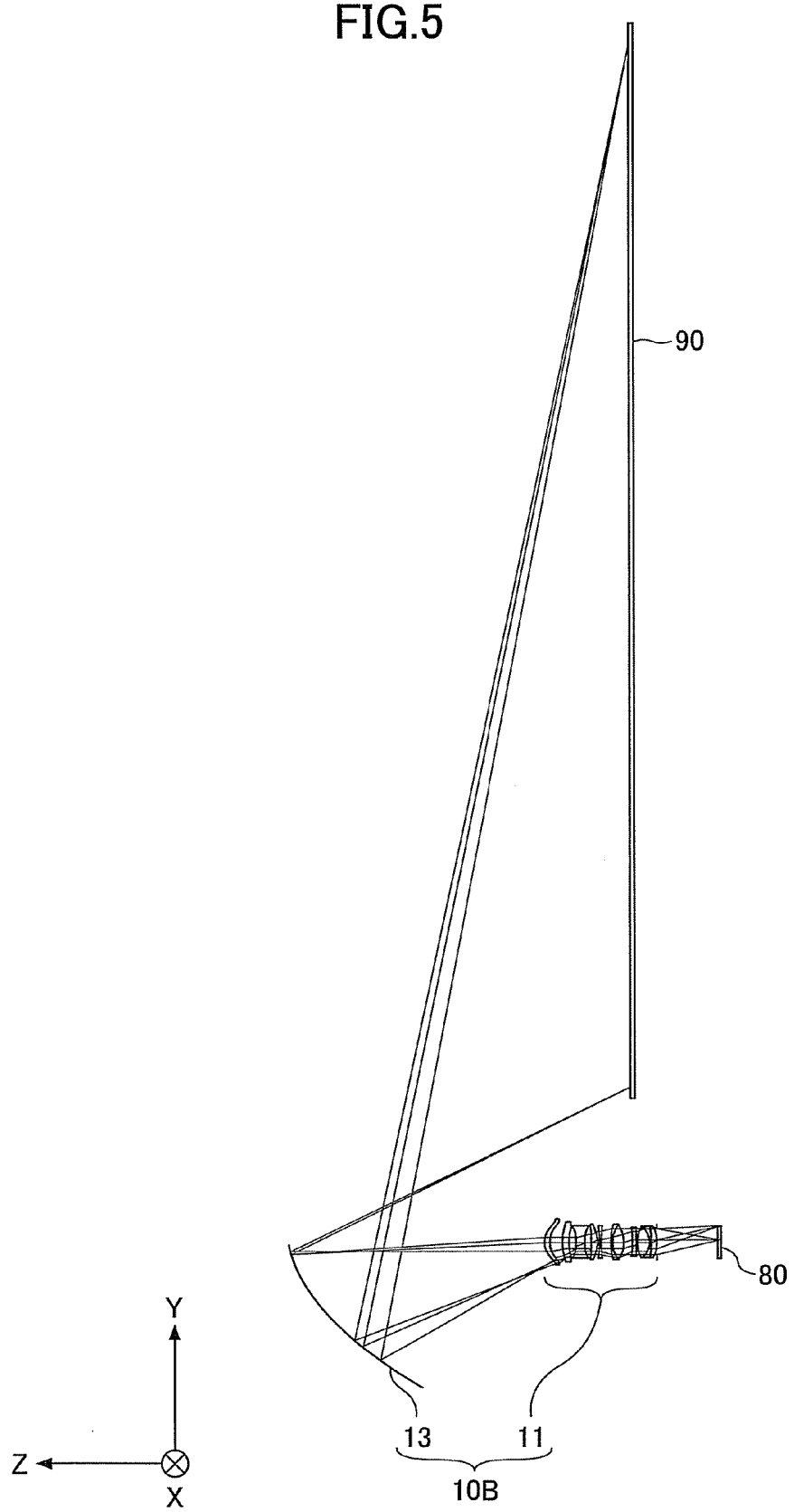
FIG. 5 is a ray diagram illustrating a projection optical system according to Comparative Example 2 in the first embodiment.

FIG. 4 is a ray diagram illustrating a projection optical system according to Comparative Example 1. FIG. 5 is a ray diagram illustrating a projection optical system according to Comparative Example 2. In the coordinate system in FIG. 4 and FIG. 5, X, Y, and Z denote the long axis directions, the normal directions, and the short axis directions, respectively, of the screen 90.

Referring to FIG. 4 and FIG. 5, a projection optical system 10A according to Comparative Example 1 and a projection optical system 10B according to Comparative Example 2 have the same configuration as the projection optical system 10 according to the first embodiment except that the second optical system 12 is not provided.

The projection optical system 10A illustrated in FIG. 4 makes it possible to reduce the projection distance as the projection optical system 10. However, further reduction in the projection distance causes the projection distance to be shorter than the overall length of the projection optical system 10A as in the projection optical system 10B illustrated in FIG. 5. As is seen from FIG. 5, where part of the image forming device 80 and the first optical system 11 is on the right side in the plane of paper relative to the screen 90, the projection optical system 10B is used with part of the projection optical system 10B being embedded in the screen 90, which reduces usability.

Like in the projection optical system 10 according to the first embodiment, such a problem may be avoided by providing the second optical system 12 and changing the path of light traveling from the first optical system 11 to the third optical system 13 with the reflection region 12a of the second optical system 12.

Thus, according to the first embodiment, the path of light traveling from the first optical system 11 to the third optical system 13 is changed with the reflection region 12a of the second optical system 12. Therefore, even when the projection distance becomes shorter than the overall length of the projection optical system 10, the image projector may be used without being embedded in the screen 90. Further, the second optical system 12 having the reflection region 12a and the transmission region 12b is caused to serve as a dustproof cover as well. Therefore, it is possible to prevent an entry of foreign matter into the housing 70 that accommodates the projection optical system 10, thus making it possible to prevent the contamination, the breakage, etc., of the projection optical system 10.

Further, the boundary 12c between the reflection region 12a and the transmission region 12b is linear. This allows the reflection process to be performed with multiple pieces of a material to become second optical systems 12 being arranged, thus making it possible to manufacture a large number of second optical systems 12 in a simple manner.

[First Variation of First Embodiment]

The first embodiment illustrates the case of dividing the second optical system 12 into the reflection region 12a and the transmission region 12b by the boundary 12c. In a first variation of the first embodiment, a case is illustrated where the boundary 12c is nonlinear and the second optical system 12 is divided by the nonlinear boundary 12c.

Figure 6:
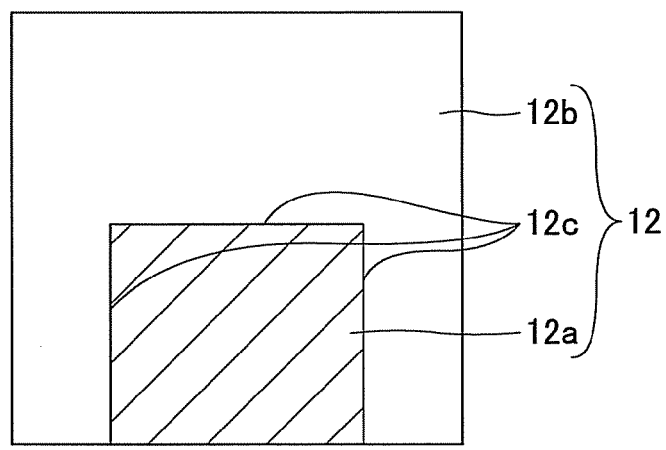
FIG. 6 is a diagram illustrating the second optical system viewed in a normal direction of the reflection region according to a first variation of the first embodiment.

FIG. 6 is a diagram illustrating the second optical system 12 viewed in a normal direction of the reflection region 12a according to the first variation of the first embodiment.

The reflection region 12a may be within a range where rays of light that have passed through the first optical system 11 are incident on the second optical system 12. That is, the reflection region 12a may be so defined as to satisfy a condition that all of the rays of light that have passed through the first optical system 11 are turned (reflected) back from the reflection region 12a. For example, as illustrated in FIG. 6, the boundary 12c between the reflection region 12a and the transmission region 12b may be provided in both parallel and vertical directions to the direction of gravity (the downward direction in FIG. 6). This minimizes the required area of the reflection region 12a, so that it is possible to reduce the manufacturing cost for the reflection process.

Thus, according to the first variation of the first embodiment, the boundary 12c between the reflection region 12a and the transmission region 12b is provided not only in a direction perpendicular to the direction of gravity but also in both parallel and perpendicular directions to the direction of gravity. As a result, in addition to the same effects as in the first embodiment, the following effect is produced. That is, compared with the first embodiment, the area of the reflection area 12a may be further reduced, so that the manufacturing cost for the reflection process may be further reduced.

[Second Variation of First Embodiment]

In the first variation of the first embodiment, the case is illustrated where the second optical system 12 is divided by the nonlinear boundary 12c. In a second variation of the first embodiment, another case of dividing the second optical system 12 by the nonlinear boundary 12c is illustrated.

Figure 7:
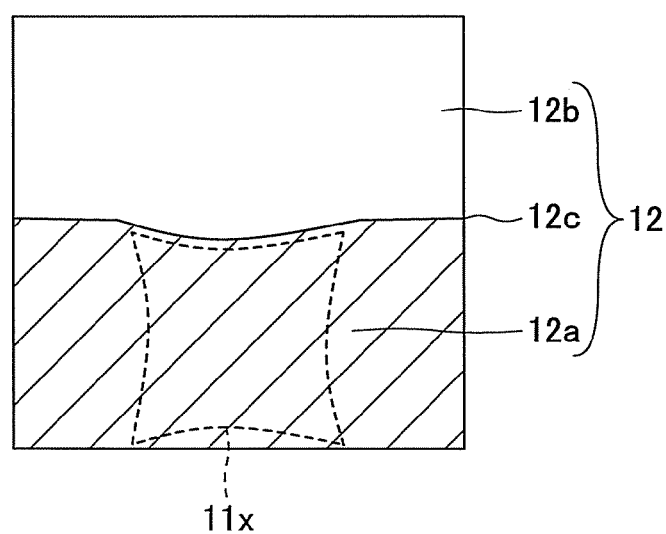
FIG. 7 is a diagram illustrating the second optical system in a normal direction of the reflection region according to a second variation of the first embodiment.

FIG. 7 is a diagram illustrating the second optical system 12 in a normal direction of the reflection region 12a according to the second variation of the first embodiment. In FIG. 7, the shape of an image at a time when rays of light that have passed through the first optical system 11 are made incident on the second optical system 12 is indicated by a broken line, and is referred to as "image shape 11x."

Since the reflection region 12a of the second optical system 12 may have a shape corresponding to the image shape 11x, the boundary 12c between the reflection region 12a and the transmission region 12b may be curved along the image shape 11x. This allows the area of the reflection region 12a to be reduced, thus allowing the manufacturing cost for the reflection process to be reduced, compared with the case of FIG. 3.

Figure 8:
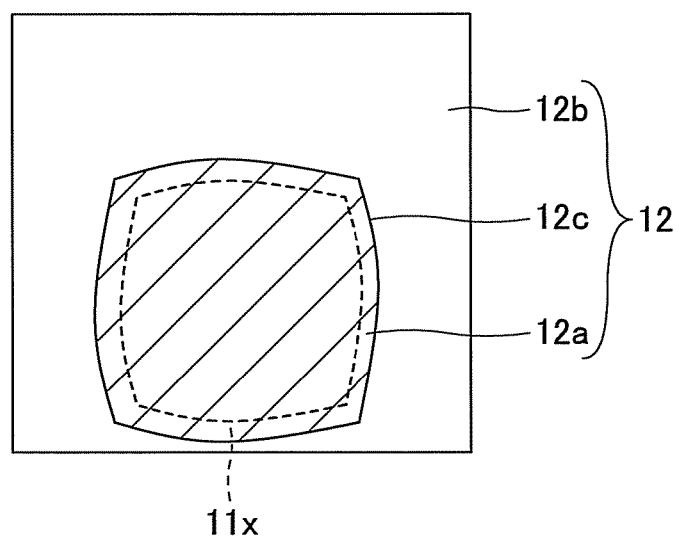
FIG. 8 is another diagram illustrating the second optical system viewed in a normal direction of the reflection region according to the second variation of the first embodiment.

Further, as in the first variation of the first embodiment, the reflection region 12a may be within a range where rays of light that have passed through the first optical system 11 are incident on the second optical system 12. That is, the reflection region 12a may be so defined as to satisfy a condition that all of the rays of light that have passed through the first optical system 11 are turned (reflected) back from the reflection region 12a. FIG. 8 is another diagram illustrating the second optical system 12 viewed in a normal direction of the reflection region 12a. For example, as illustrated in FIG. 8, the boundary 12c between the reflection region 12a and the transmission region 12b may be provided in both parallel and vertical directions to the direction of gravity. This minimizes the required area of the reflection region 12a, so that it is possible to further reduce the manufacturing cost for the reflection process compared with the case of FIG. 7.

The image shape 11x differs between FIG. 7 and FIG. 8. This illustrates that the image shape 11x in the reflection region 12a differs depending on the configuration of the projection optical system 10. By optimizing the shape of the reflection region 12a so that the shape of the reflection region 12a is along the image shape 11x, it is possible to minimize an area to be subjected to the reflection process. FIG. 7 and FIG. 8 illustrate examples of the image shape 11x, and the image shape 11x may be different from those illustrated in FIG. 7 and FIG. 8 depending on the configuration of the projection optical system 10.

Thus, according to the second variation of the first embodiment, the boundary 12c between the reflection region 12a and the transmission region 12b is not linear, and has a shape corresponding to the image shape 11x in the reflection region 12a. As a result, in addition to the same effects as in the first embodiment, the following effect is produced. That is, compared with the first embodiment, the area of the reflection area 12a may be further reduced, so that the manufacturing cost for the reflection process may be further reduced.

[Second Embodiment]

In the first embodiment, the case is illustrated where the second optical system 12 is planar (flat). In a second embodiment, a case of bending the second optical system is illustrated.

Figure 9:
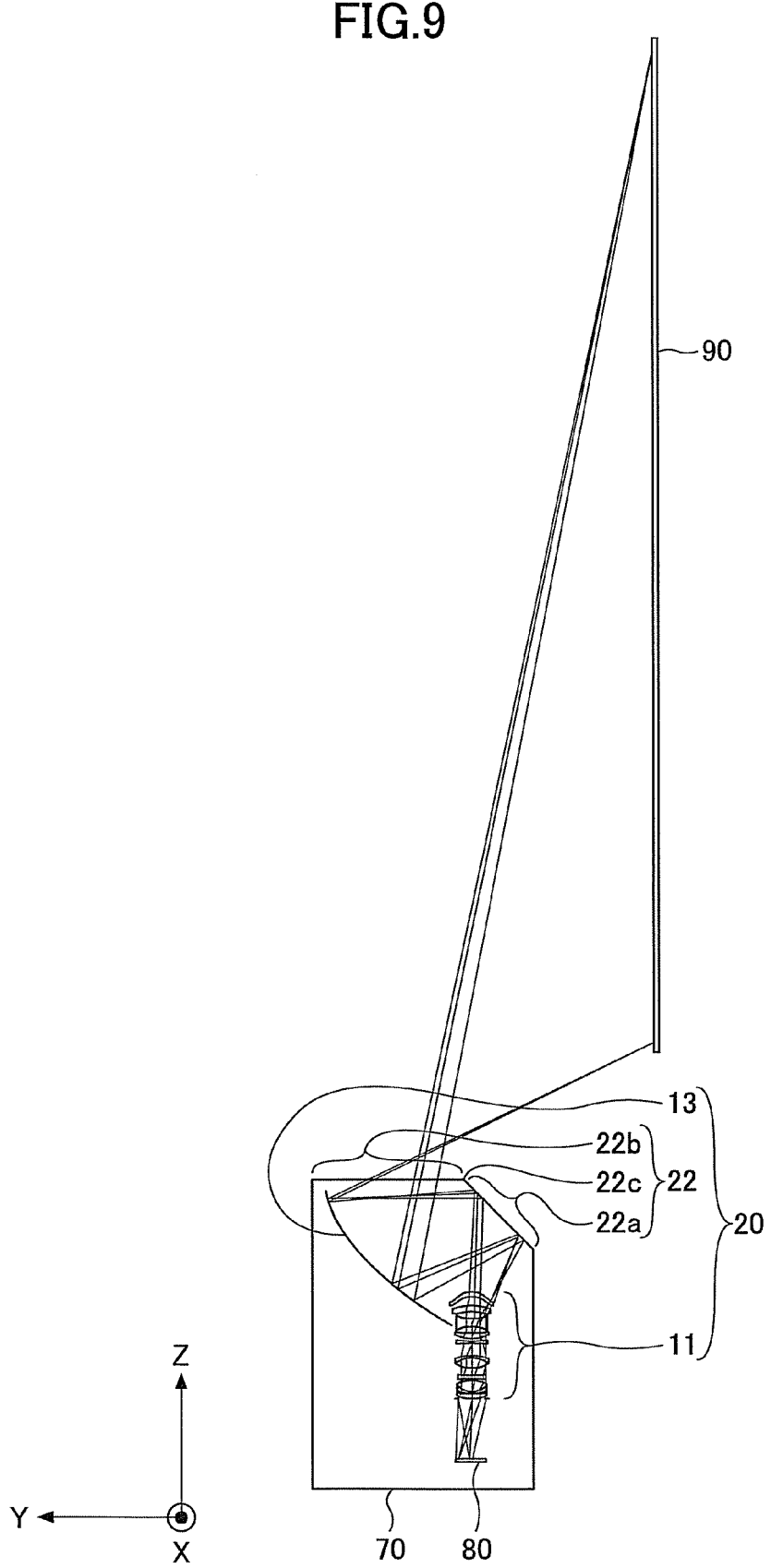
FIG. 9 is a ray diagram illustrating a projection optical system according to a second embodiment.
Figure 10:
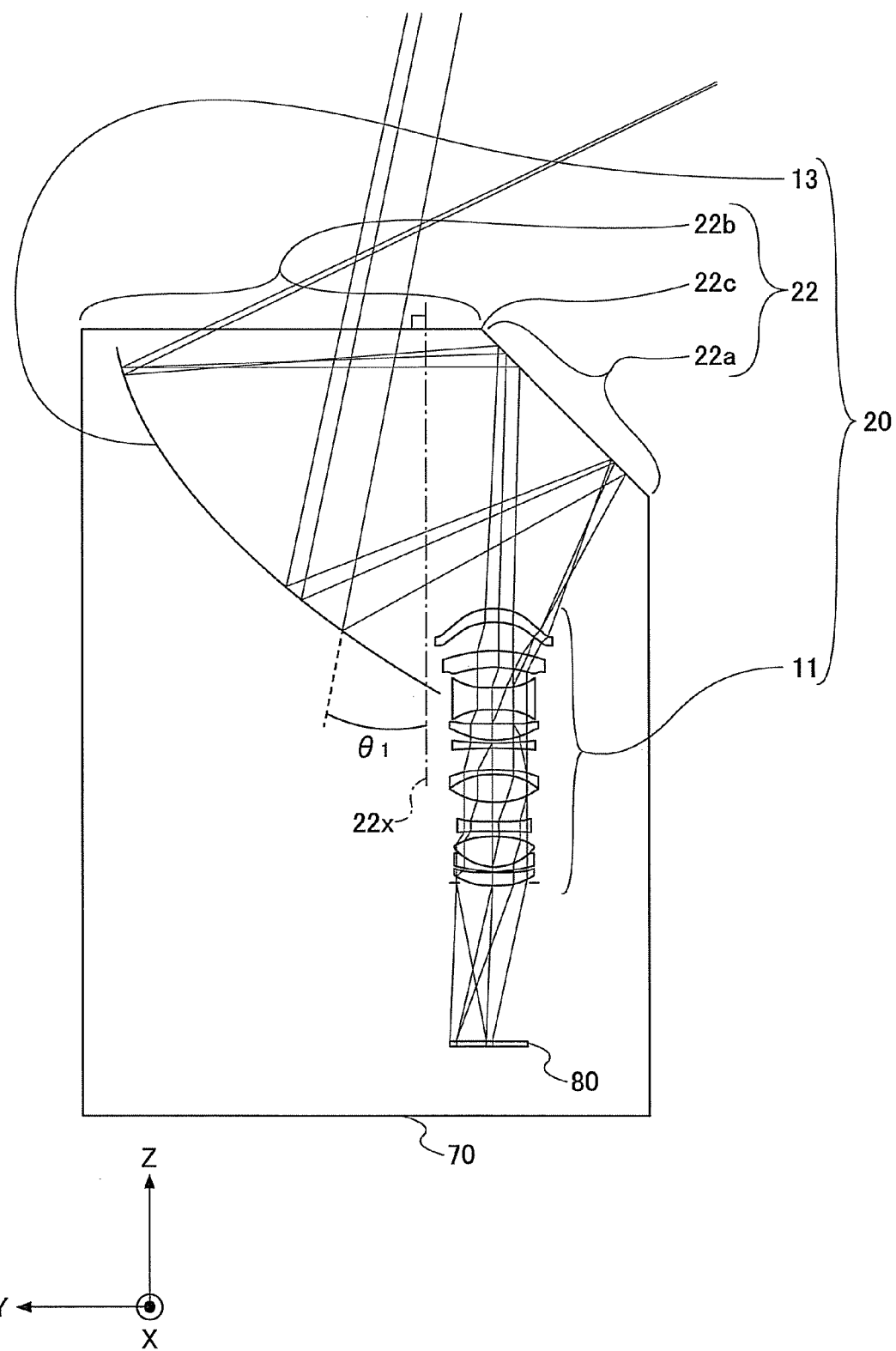
FIG. 10 is an enlarged view of part of FIG. 9 according to the second embodiment.

FIG. 9 is a ray diagram illustrating a projection optical system according to the second embodiment. FIG. 10 is an enlarged view of part of FIG. 9. In the coordinate system in FIG. 9 and FIG. 10, X, Y, and Z denote the long axis directions, the normal directions, and the short axis directions, respectively, of the screen 90.

Referring to FIG. 9 and FIG. 10, a projection optical system 20 is different from the projection optical system 10 (FIG. 1 and FIG. 2) in having a second optical system 22 that replaces the second optical system 12.

The second optical system 22 includes a reflection region 22a and a transmission region 22b. The second optical system 22 is so attached as to close the opening of the housing 70. The second optical system 22 is bent at a boundary 22c between the reflection region 22a and the transmission region 22b. That is, in the second optical system 22, the reflection region 22a and the transmission region 22b are not in the same plane. The reflection region 22a is positioned at a predetermined angle of inclination relative to the X-Y plane. The transmission region 22b is positioned substantially parallel to the X-Y plane.

The reflection region 22a functions as a folding mirror that changes (bends) the path of light traveling from the first optical system 11 to the third optical system 13. The transmission region 22b has the function of transmitting light subjected to a path change by the third optical system 13. The light that has passed through the transmission region 22b reaches the screen 90. For example, the second optical system 22 may be manufactured easily by bending the second optical system 12 manufactured of flat glass or plastic.

Like the second optical system 12, the second optical system 22 functions as a dustproof cover. That is, since the second optical system 22 closes the opening of the housing 70, it is possible to prevent an entry of foreign matter into the housing 70 and to prevent contamination or breakage of the first optical system 11 and the third optical system 13. Further, the second optical system 22 serves as a dustproof cover as well. This facilitates assembly compared with the case where the second optical system 22 and the dustproof cover are separately provided. In addition, a holding member to hold the dustproof cover and the second optical system 22, which is necessary in the case where the dustproof cover and the second optical system 22 are separate bodies, is unnecessary. Therefore, there is no concern for an eclipse of light by the holding member, thus facilitating the adjustment of positions.

In FIG. 10, in the projection optical system 20, a ray of light reflected back from the third optical system 13 on the side closest to the first optical system 11 is incident on the transmission region 22b at an angle of incidence $\theta_1$ (an angle to a normal 22x of the transmission region 22b). A description is given below of the angle of incidence $\theta_1$.

Figure 11:
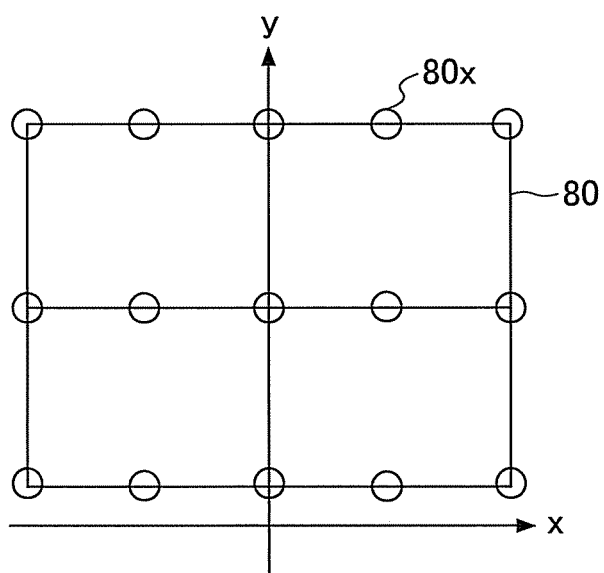
FIG. 11 is a diagram illustrating rays of light emitted from an image forming device.
Figure 12:
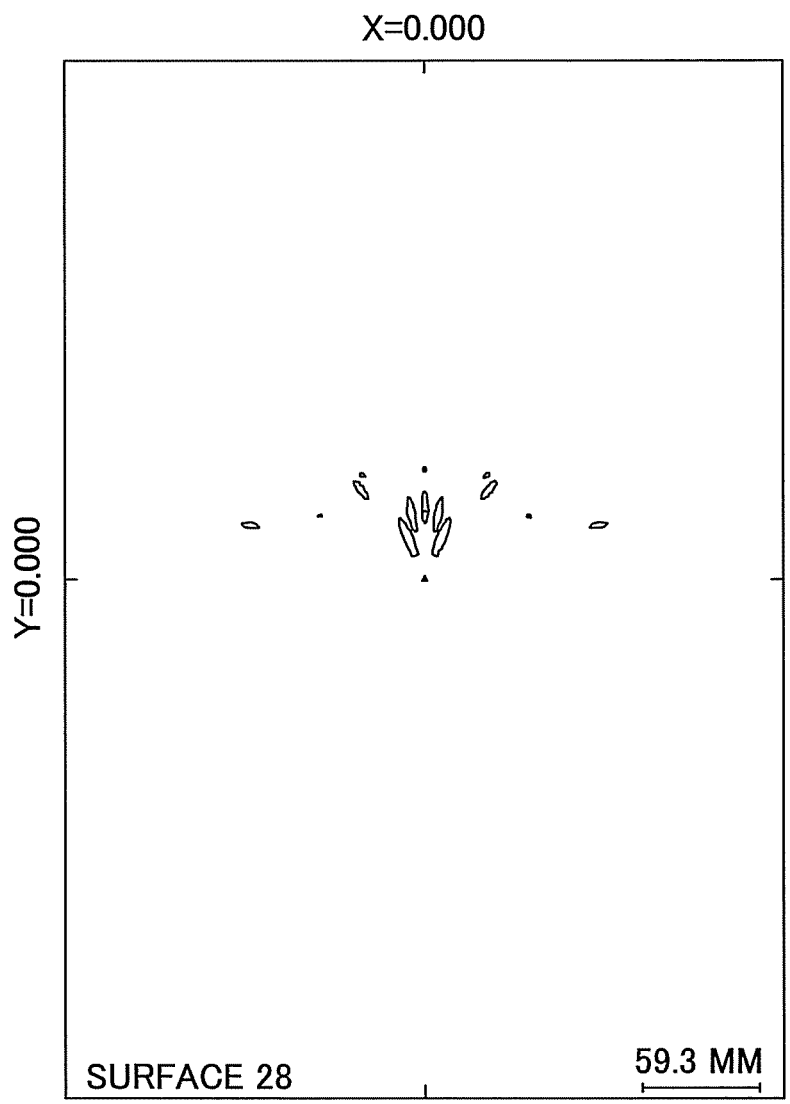
FIG. 12 is a diagram illustrating positions where the individual rays of FIG. 11 pass through a transmission region of the second optical system in the projection optical system according to the first embodiment.
Figure 13:
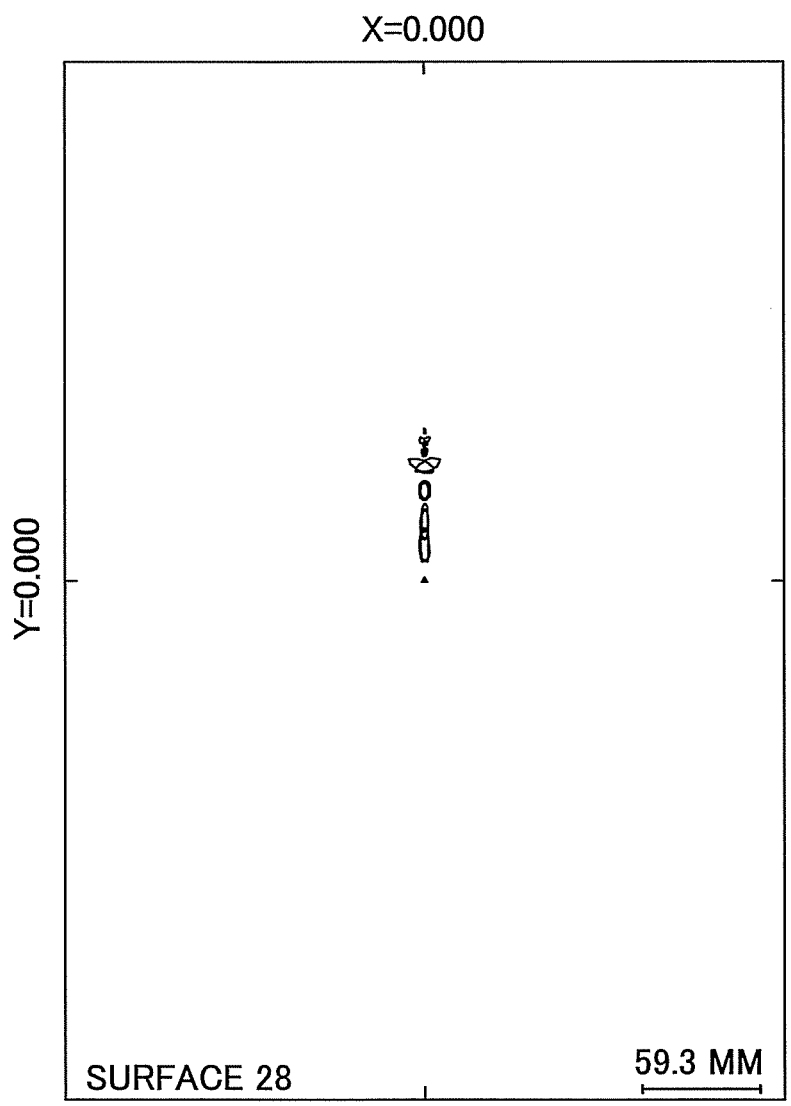
FIG. 13 is a diagram illustrating positions where the individual rays of FIG. 11 pass through a transmission region of a second optical system in the projection optical system according to the second embodiment.

FIG. 11 is a diagram illustrating rays of light emitted from the image forming device 80. FIG. 12 is a diagram illustrating positions where the individual rays of FIG. 11 pass through the transmission region 12b of the second optical system 12 in the projection optical system 10 according to the first embodiment. FIG. 13 is a diagram illustrating positions where the individual rays of FIG. 11 pass through the transmission region 22b of the second optical system 22 in the projection optical system 20 according to the second embodiment.

In the projection optical system 10 according to the first embodiment, rays of light 80x emitted from the image forming device 80 as illustrated in FIG. 11 pass through the transmission region 12b of the second optical system 12 at the positions of FIG. 12. On the other hand, in the projection optical system 20 according to the second embodiment, the rays of light 80x emitted from the image forming device 80 as illustrated in FIG. 11 pass through the transmission region 22b of the second optical system 22 at the positions of FIG. 13.

The comparison of FIG. 12 and FIG. 13 shows that an area of the transmission region where the rays of light reflected back from the reflection region of the second optical system pass through after being reflected back from the third optical system is smaller in the projection optical system 20 than in the projection optical system 10. This is because the transmission region 22b is located near a light focusing position in the projection optical system 20. In particular, in short-range projectors, rays of light reflected back from the second optical system have a large angle of divergence so that the area of the rays that pass through the transmission region differs greatly depending on the position of the transmission region. Accordingly, the required area of the transmission region may be reduced by positioning the transmission region near a light focusing position.

Figure 14:
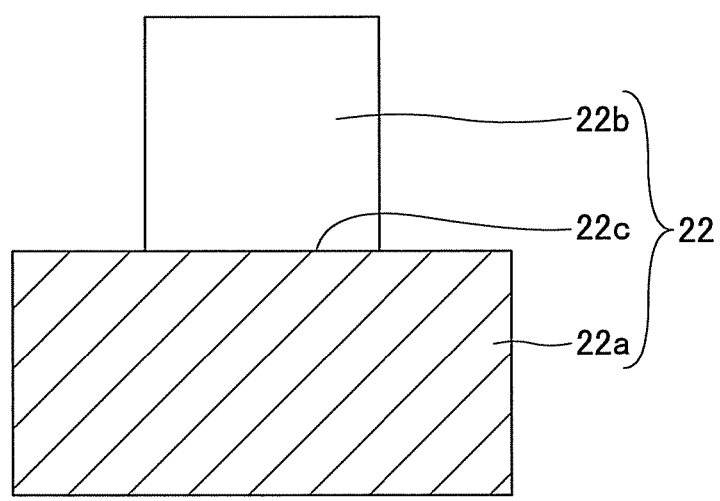
FIG. 14 is a diagram illustrating the second optical system viewed in a normal direction of a reflection region according to the second embodiment.

FIG. 14 is a diagram illustrating the second optical system 22 viewed in a normal direction of the reflection region 22a.

As illustrated in FIG. 14, the transmission region 22b may be reduced in size by positioning the transmission region 22b near a light focusing position. As a result, it is possible to reduce the manufacturing cost of the second optical system 22. Further, the transmission region 22b defines part of the upper surface of the projector. Therefore, reduction in the size of the transmission region 22b may also contribute to reduction in the size of the projector.

Thus, according to the second embodiment, the second optical system 22 is bent. As a result, in addition to the same effects as in the first embodiment, the following effect is produced. That is, positioning the transmission region 22b near a light focusing position reduces the size of a light beam passing through the transmission region 22b. Therefore, it is possible to reduce the transmission region 22b in size, so that it is possible to reduce the manufacturing cost of the second optical system 22. Further, it is possible to reduce the size of the projector.

The second optical system 22 may not necessarily be bent at the boundary 22c between the reflection region 22a and the transmission region 22b. That is, the second optical system 22 may not necessarily be divided completely into the reflection region 22a and the transmission region 22b at the bent part. The second optical system 22 may be so bent as to be divided into a first region based on the transmission region 22b and a second region based on the reflection region 22a. For example, the second optical system 22 may have the reflection region 22a formed like the reflection region 12a as illustrated in FIG. 6, FIG. 7, or FIG. 8, and be bent as illustrated in FIG. 10. In this case, the transmission region 22b illustrated in FIG. 10 may be a first region based on a transmission region, and the reflection region 22a illustrated in FIG. 10 may be a second region based on a reflection region formed as illustrated in FIG. 6, FIG. 7, or FIG. 8.

[Third Embodiment]

In the first embodiment, the case is illustrated where the second optical system 12 is flat, and in the second embodiment, the case is illustrated where the second optical system 22 is bent. In a third embodiment, a case of tilting the transmission region toward a screen in the second embodiment is illustrated.

Figure 15:
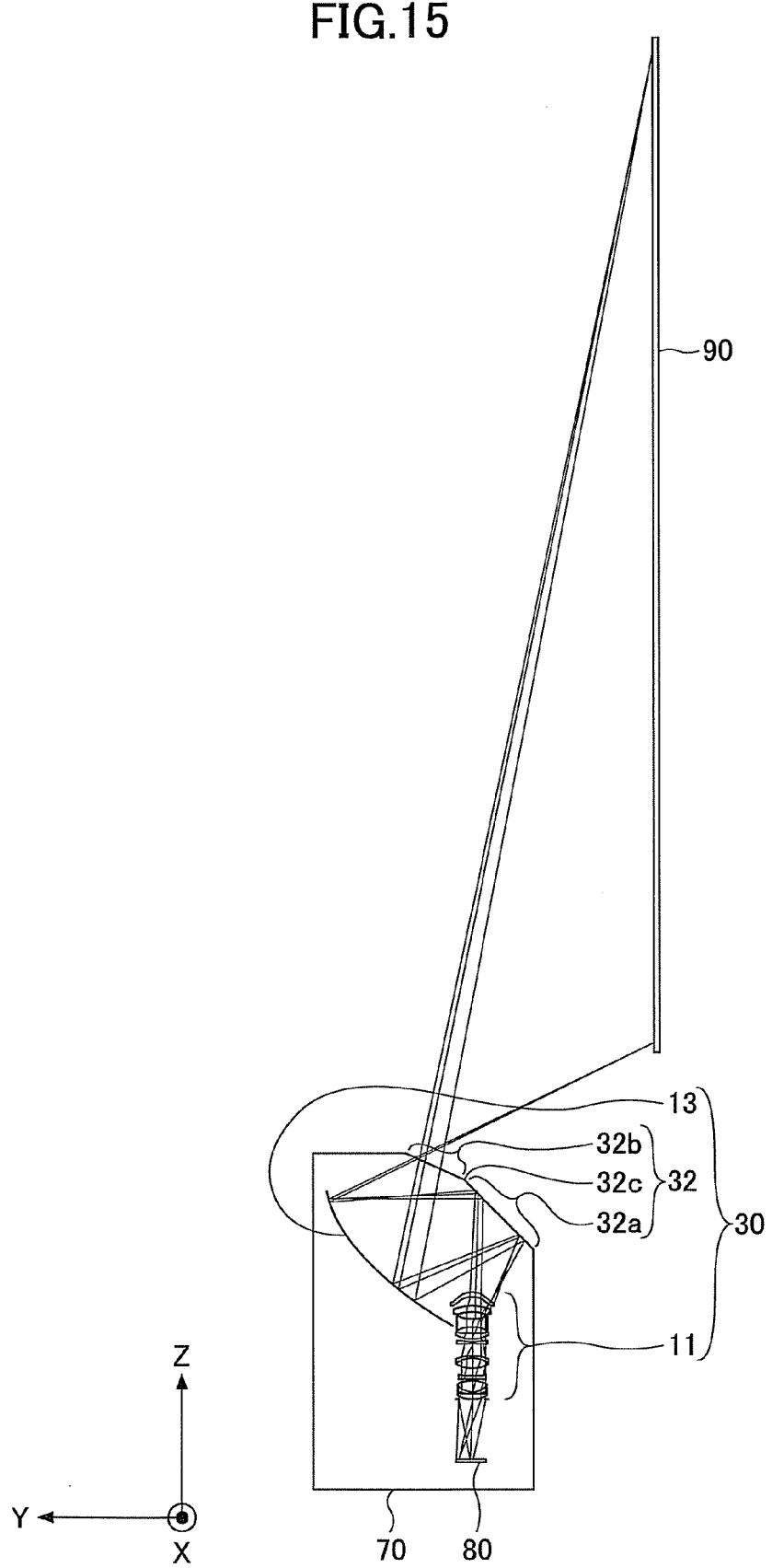
FIG. 15 is a ray diagram illustrating a projection optical system according to a third embodiment.
Figure 16:
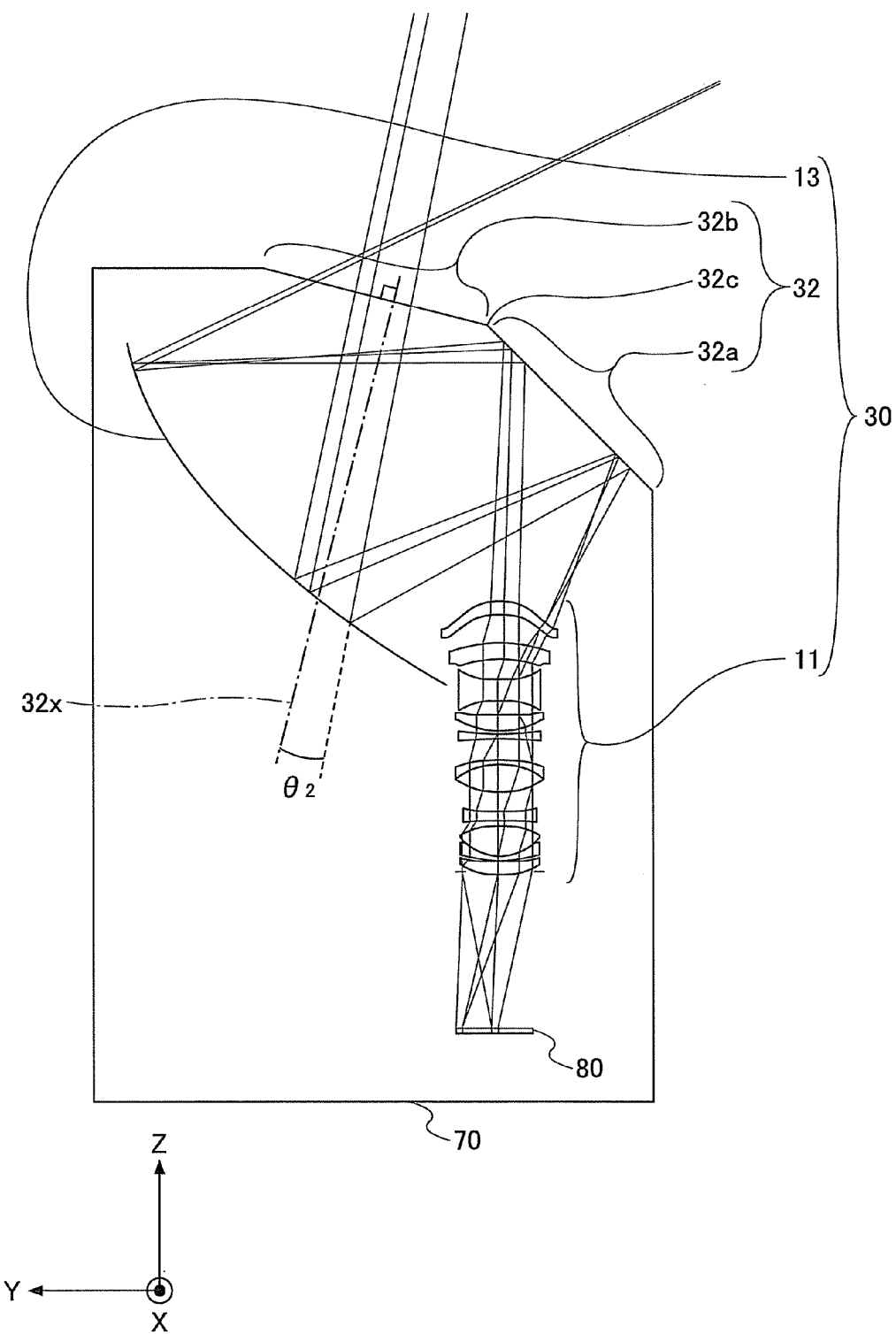
FIG. 16 is an enlarged view of part of FIG. 15 according to the third embodiment.

FIG. 15 is a ray diagram illustrating a projection optical system according to the third embodiment. FIG. 16 is an enlarged view of part of FIG. 15. In the coordinate system in FIG. 15 and FIG. 16, X, Y, and Z denote the long axis directions, the normal directions, and the short axis directions, respectively, of the screen 90.

Referring to FIG. 15 and FIG. 16, a projection optical system 30 is different from the projection optical system 20 (FIG. 6 and FIG. 10) in having a second optical system 32 that replaces the second optical system 22.

The second optical system 32 includes a reflection region 32a and a transmission region 32b. The second optical system 32 is so attached as to close the opening of the housing 70. The second optical system 32 is bent at a boundary 32c between the reflection region 32a and the transmission region 32b.

That is, in the second optical system 32, the reflection region 32a and the transmission region 32b are not in the same plane. The reflection region 32a is positioned at a first angle of inclination relative to the X-Y plane. The transmission region 32b is positioned at a second angle of inclination relative to the X-Y plane. That is, while the transmission region 22b is positioned substantially parallel to the X-Y plane in the projection optical system 20 (FIG. 9 and FIG. 10), the transmission region 32b is tilted to face the screen 90 in the projection optical system 30 compared with the transmission region 22b. In FIG. 15 and FIG. 16, the first angle of inclination is greater than the second angle of inclination.

The reflection region 32a functions as a folding mirror that changes (bends) the path of light traveling from the first optical system 11 to the third optical system 13. The transmission region 32b has the function of transmitting light subjected to a path change by the third optical system 13. The light that has passed through the transmission region 32b reaches the screen 90. For example, the second optical system 32 may be manufactured easily by bending the second optical system 12 manufactured of flat glass or plastic.

Like the second optical system 22, the second optical system 32 functions as a dustproof cover. That is, since the second optical system 32 closes the opening of the housing 70, it is possible to prevent an entry of foreign matter into the housing 70 and to prevent contamination or breakage of the first optical system 11 and the third optical system 13. Further, the second optical system 32 serves as a dustproof cover as well. This facilitates assembly compared with the case where the second optical system 32 and the dustproof cover are separately provided. In addition, a holding member to hold the dustproof cover and the second optical system 32, which is necessary in the case where the dustproof cover and the second optical system 32 are separate bodies, is unnecessary. Therefore, there is no concern for an eclipse of light by the holding member, thus facilitating the adjustment of positions.

Figure 17:
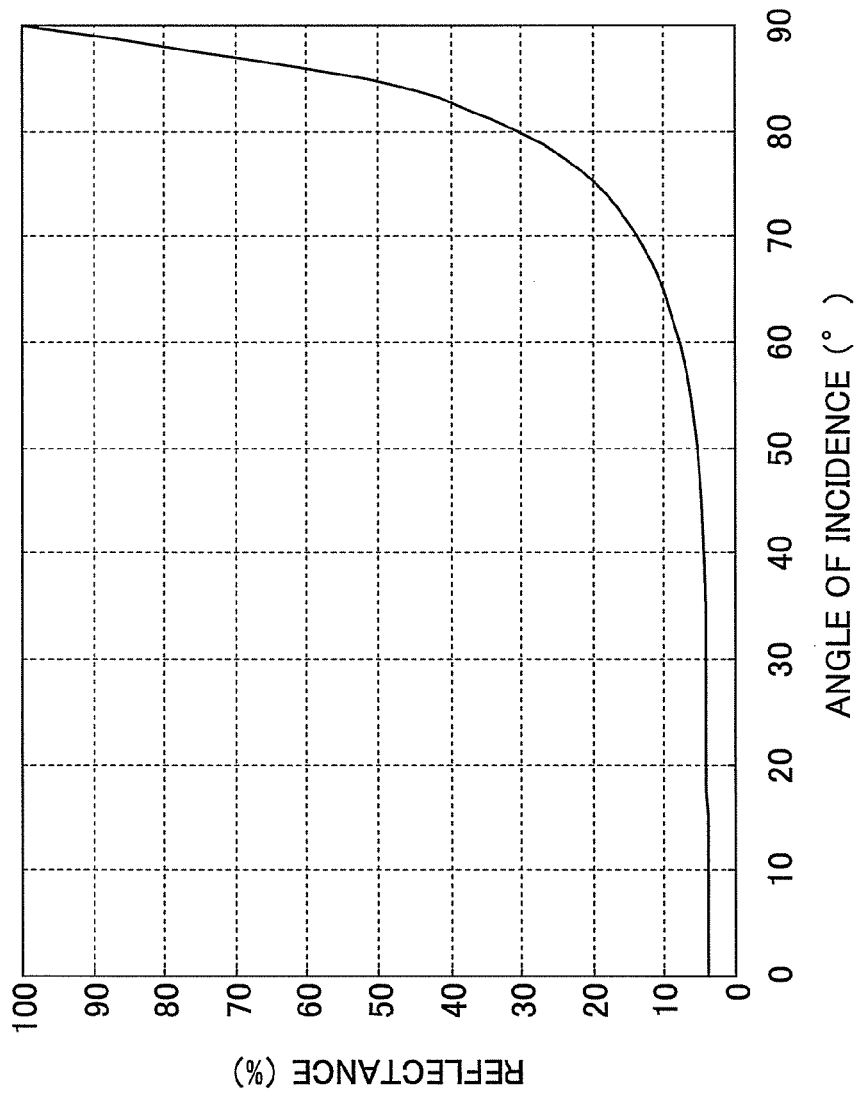
FIG. 17 is a graph illustrating reflectance with respect to the angle of incidence of light in a transmission region according to the third embodiment.

Part of light made incident on the transmission region 32b is reflected from a plane of incidence, thus causing a loss. The reflectance in the transmission region 32b differs depending on the angle of incidence of light. Here, the angle of incidence refers to the angle formed by light and the normal of a plane of incidence at the position of incidence of the light. FIG. 17 is a graph illustrating reflectance with respect to the angle of incidence of light in the transmission region 32b. As illustrated in FIG. 17, the reflectance increases as the angle of incidence of light made incident on the transmission region 32b increases.

In FIG. 16, in the projection optical system 30, a ray of light reflected back from the third optical system 13 on the side closest to the first optical system 11 is incident on the transmission region 32b at an angle of incidence $\theta_2$ (an angle to a normal 32x of the transmission region 32b). As illustrated in FIG. 10, in the projection optical system 20, each ray of light reflected back from the third optical system 13 is incident on the transmission region 22b at an angle of incidence greater than 0°. This is also clear from the rays of light that have passed through the transmission region 22b being directed to the screen 90. On the other hand, in the projection optical system 30, the transmission region 32b is tilted toward the screen 90 compared with the transmission region 22b as illustrated in FIG. 16, so that $\theta_1$ is greater than $\theta_2$ ($\theta_1 > \theta_2$). As a result, as is seen from FIG. 17, reduction in the luminance of a projected image due to reflection in the transmission region is more controlled with the transmission region 32b than with the transmission region 22b.

An antireflection coating (AR coating) may be applied on the transmission region 32b to further reduce reflectance. The antireflection coating applied on the transmission region 32b may not necessarily be homogeneous. The transmission region 32b may be divided into sub regions, and the antireflection coating may be so locally different in characteristics in accordance with the angle of incidence of light in each of the sub regions as to reduce reflection. By applying such an antireflection coating, reduction in the luminance of a projected image due to reflection in the transmission region 32b may be further reduced. The antireflection coating may be applied to the transmission regions 12b and 22b as well.

Figure 18:
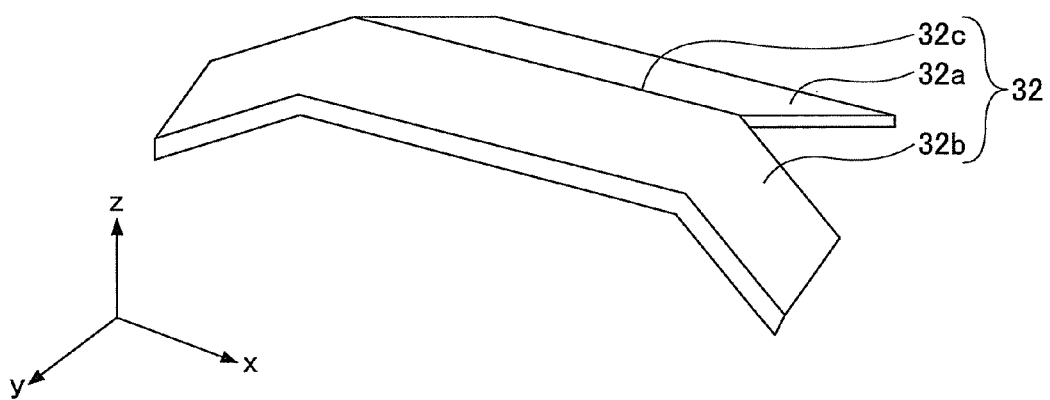
FIG. 18 is a perspective view of the bent transmission region of the second optical system according to the third embodiment.

Further, the transmission region 32b may not necessarily define a flat surface. A light beam passing through the transmission region 32b is divergent not only in the Z-axis directions but also in the X-Y plane. Accordingly, it is preferable to so bend the transmission region 32b, for example, in the X-axis directions (the long axis directions of the screen 90) as illustrated in FIG. 18, as to reduce the angle of incidence of each of rays of light passing through respective points of the transmission region 32b. More specifically, it is preferable to bend each of the X-axial end portions of the transmission region 32b toward the third optical system 13. This allows light to be incident on the transmission region 32b at a smaller angle of incidence, thus making it possible to further control reduction in the luminance of a projected image due to reflection in the transmission region 32b.

The transmission region 32b is bent at two points in FIG. 18, while the transmission region 32b may be bent at a larger number of points. By bending the transmission region 32b at multiple points to reduce the angle of incidence of light passing through each bent portion, it is possible to further control reduction in the luminance of a projected image due to reflection in the transmission region 32b.

Further, the transmission region 32b may not necessarily define a flat surface, and may have a shape with such a predetermined curvature as to reduce the angle of incidence of light. This makes it possible to further control reduction in the luminance of a projected image due to reflection in the transmission region 32b, and also to reduce the size of the projector.

Thus, according to the third embodiment, the transmission region 32b of the second optical system 30 is so inclined toward the screen 90 as to reduce the angle of incidence of light incident on the transmission region 32b. As a result, in addition to the same effects as in the first embodiment, the following effect is produced. That is, it is possible to reduce the angle of incidence of light incident on the transmission region 32b, so that it is possible to control reduction in the luminance of a projected image due to reflection in the transmission region 32b. Further, by applying an antireflection coating (AR coating) on the transmission region 32b, bending the X-axial end portions of the transmission region 32b toward the third optical system 13, and/or providing the transmission region 32b with such a predetermined curvature as to reduce the angle of incidence of light incident on the transmission region 32b, it is possible to further control reduction in the luminance of a projected image due to reflection in the transmission region 32b.

[Fourth Embodiment]

In a fourth embodiment, by way of example, an image projector including the projection optical system 10 according to the first embodiment is illustrated. In the fourth embodiment, the same elements as those of the first embodiment are referred to by the same reference numerals, and a description thereof is omitted.

Figure 19:
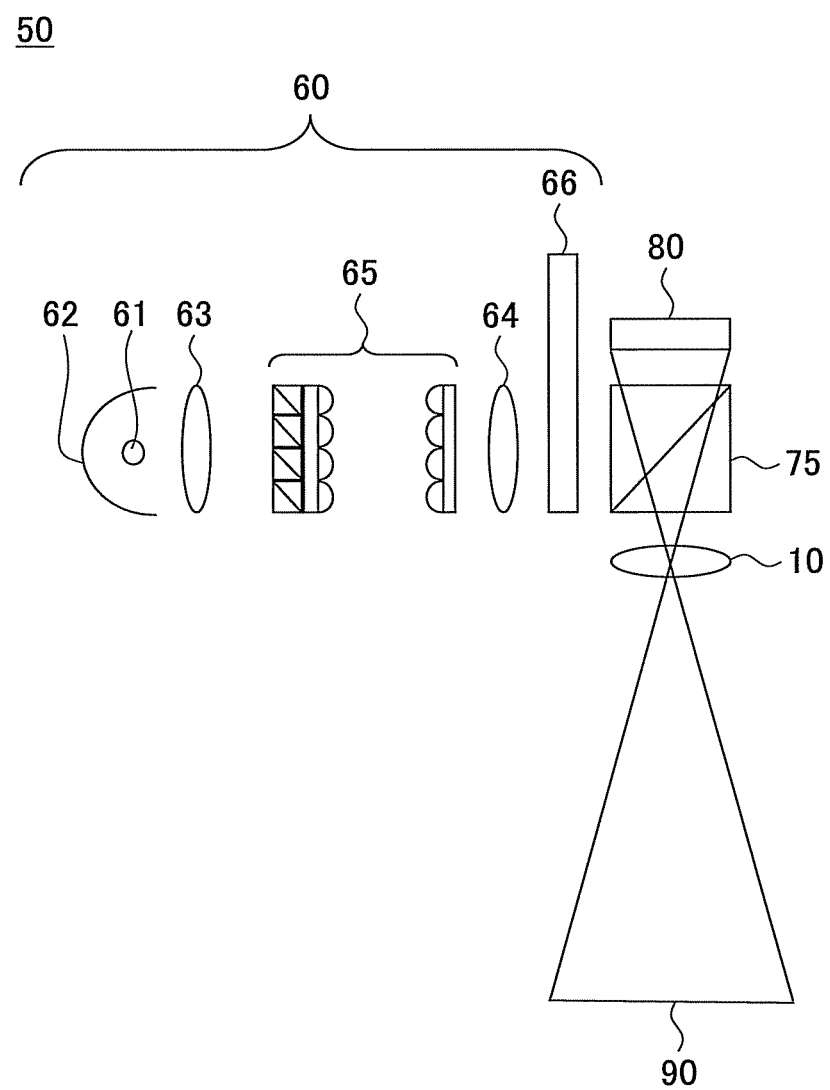
FIG. 19 is a schematic diagram illustrating an image projector according to a fourth embodiment.

FIG. 19 is a schematic diagram illustrating an image projector according to the fourth embodiment.

Referring to FIG. 19, an image projector 50 according to the fourth embodiment includes the projection optical system 10 according to the first embodiment, a lighting optical system 60, a splitting part 75, and the image forming device 80. The image projector 50 may further include a lighting power source, a modulation part for the image forming device 80, and an image processing unit (all of which are not graphically illustrated). The image projector 50 may include the projection optical system 20 or 30 in place of the projection optical system 10.

The lighting optical system 60 includes a light source 61; a reflector 62, which is, for example, disposed near the light source 61; relay lenses 63 and 64; and an illuminance uniforming part 65 called an integrator optical system, which is configured to make uniform the illuminance of a luminous flux reflected back with directivity from the reflector 62. The reflector 62 may be formed as a unit with the light source 61. The lighting optical system 60 is so configured as to have a uniform distribution of lighting on the surface of the image forming device 80. Examples of the light source 61 include a halogen lamp, a xenon lamp, a metal halide lamp, an ultra-high pressure mercury lamp, and a light-emitting diode (LED).

The lighting optical system 60 may further include a color wheel 66 to colorize illuminating light, and a color image may be projected by controlling the image of the image forming device in synchronization with the colorization of illuminating light. In the case of using a reflection liquid-crystal image forming device as the image forming device 80, use of the splitting part 75 configured to split a lighting optical path and a projection optical path allows lighting to be performed with better efficiency. Further, in the case of using a digital micromirror device (DMD) as the image forming device 80, optical path splitting using a total reflection prism is adopted, for example. Thus, an appropriate optical system may be adopted in accordance with the kind of the image forming device 80.

A color image may be projected onto the screen 90 by using multiple image forming devices 80 of respective colors of red, green, blue, etc., illuminating the image forming devices 80 with illuminating light transmitted through respective color filters, and causing composite light formed by a color composite part to enter the projection optical system 10.

In the image projector 50, the image forming device 80 has an image formed in accordance with a modulating signal. The image forming device 80 is illuminated with illuminating light emitted from the light source 61, so that the image formed in the image forming device 80 is magnified and projected onto the screen 90 by the projection optical system 10.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that various changes, substitutions, and alterations could be made hereto without departing from the spirit and scope of the invention.

What is claimed is:

1. A projection optical system configured to project an image onto a projection surface, comprising:

a first optical system including at least one dioptric system and having positive power as a whole;

a second optical system including a reflection region and a transmission region; and a third optical system including at least one reflecting surface having power, and having positive power as a whole, wherein light entering the projection optical system passes through the first optical system to have a path thereof bent by the reflection region of the second optical system to be incident on the third optical system, and the light incident on the third optical system has the path thereof bent by the third optical system to pass through the transmission region of the second optical system to be incident on the projection surface.

2. The projection optical system as claimed in claim 1, wherein the reflection region and the transmission region are formed as a unitary body.

3. The projection optical system as claimed in claim 1, wherein the second optical system is so bent as to be divided into a first region based on the transmission region and a second region based on the reflection region.

4. The projection optical system as claimed in claim 3, wherein the first region is so tilted as to face the projection surface.

5. The projection optical system as claimed in claim 1, wherein the transmission region is bent in a long axis direction of the projection surface.

6. The projection optical system as claimed in claim 1, wherein a boundary between the reflection region and the transmission region surrounds a shape of an image formed by the light incident on the reflection region after passing through the first optical system.

7. The projection optical system as claimed in claim 1, wherein a boundary between the reflection region and the transmission region is curved along a shape of an image formed by the light incident on the reflection region after passing through the first optical system.

8. The projection optical system as claimed in claim 1, wherein a boundary between the reflection region and the transmission region is linear.

9. An image projector, comprising:

an image forming device configured to have an image formed in accordance with a modulating signal;

a light source configured to emit light; and the projection optical system as set forth in claim 1, wherein the image forming device is illuminated with the light emitted from the light source to have the image formed in the image forming device magnified and projected onto the projection surface by the projection optical system.

10. The image projector as claimed in claim 9, wherein the projection optical system except for the second optical system is accommodated in a housing having an opening, and the opening is closed with the second optical system.

11. The image projector as claimed in claim 10, wherein the second optical system forms a part of a wall of the housing, and the reflection region of the second optical system is provided on an inner wall surface of the wall.

* * * * *